United States Patent [19]
Gill

[11] Patent Number: 4,690,326
[45] Date of Patent: Sep. 1, 1987

[54] SPRAYING EQUIPMENT

[75] Inventor: David C. Gill, Bristol, United Kingdom

[73] Assignee: Nomix Manufacturing Co. Limited, Bristol, United Kingdom

[21] Appl. No.: 713,185

[22] Filed: Mar. 18, 1985

[30] Foreign Application Priority Data

Mar. 19, 1984 [GB] United Kingdom ................. 8407088

[51] Int. Cl.[4] ......................... B05B 3/10; A62C 31/02; F16K 5/10; B25G 3/02

[52] U.S. Cl. .................................... 239/223; 239/394; 239/397; 251/208; 403/348; 403/362

[58] Field of Search ............... 239/700, 701, 702, 703, 239/223, 224, 214, 390, 397, 394, 456, 524; 251/208, 209; 403/348, 349, 362

[56] References Cited

U.S. PATENT DOCUMENTS

| | | | |
|---|---|---|---|
| 442,865 | 12/1890 | De Kinder | 239/224 |
| 2,552,445 | 5/1951 | Nielsen | 239/456 |
| 2,888,206 | 5/1959 | Waldrum | 239/224 X |
| 3,073,531 | 1/1963 | Kothe | 239/223 |
| 3,085,749 | 4/1963 | Schweitzer et al. | 239/224 X |
| 3,452,931 | 7/1969 | Knowles | 239/224 X |
| 4,360,155 | 11/1982 | Hubbell et al. | 239/700 X |
| 4,362,275 | 12/1982 | Coffee | 239/700 |
| 4,407,217 | 10/1983 | Jackson | 239/223 X |

FOREIGN PATENT DOCUMENTS

| | | | |
|---|---|---|---|
| 1948980 | 4/1971 | Fed. Rep. of Germany | 239/394 |
| 2351709 | 12/1977 | France | 239/223 |
| 1388270 | 3/1975 | United Kingdom | 251/209 |
| 2131327 | 6/1984 | United Kingdom | 239/224 |

*Primary Examiner*—Andres Kashnikow
*Assistant Examiner*—Patrick N. Burkhart
*Attorney, Agent, or Firm*—Merchant, Gould, Smith, Edell, Welter & Schmidt

[57] ABSTRACT

A spraying head for spraying material such as herbicides comprises a rotary distribution member (22) and a body made up of a housing (4) and a cap (6) which is rotatable on the housing (4). The housing (4) has a projection (28) which projects into an aperture (74) in the cap (6) to define an annular gap (78). The housing (4) and the cap (6) also define an annular cavity (72) into which material is introduced in use, the material then flowing to the member (22) through the gap (78). Means, utilizing rotation of the cap (6) on the housing (4), is provided for adjusting the flowrate of material to the distribution member (22).

5 Claims, 13 Drawing Figures

SPRAYING EQUIPMENT

This invention relates to spraying equipment, particularly, although not exclusively, equipment for spraying herbicides and other agricultural and horticultural agents.

So-called "spinning disc" applicators for herbicides and other agents are known (see, for example, British Patent Specification No. 2131327). These applicators have a rotary distribution element or "disc" which is rotated at speeds of, for example, between 200 and 4000 rpm. The agent to be applied is fed to the surface of the disc and is ejected from the periphery of the disc by centrifugal force. Applicators of this type are capable of producing a well-defined spray pattern with an even droplet size under most conditions. The width of the spray pattern can be altered by changing the speed of rotation of the disc, and the spray density can be altered by changing the rate of flow of the agent to the disc. However, it is essential for proper operation for the agent to be distributed evenly around the periphery of the disc, otherwise more agent will be ejected from one portion of the disc than from another, leading to an asymmetric spray pattern. This would then mean that some parts of the treated area would receive more of the agent than is necessary, while other parts of the treated area would receive too little of the agent to be effective.

According to the present invention there is provided a spraying head comprising a body which supports a rotary distribution element, the body comprising two body components, one of which has a projection which is coaxial with the distribution element, and the other body component having an aperture in which the projection is situated to define an annular gap, the two body components defining between them an annular cavity which communicates with the gap, the cavity having an inlet for material to be sprayed, whereby, in use, material entering the annular cavity is discharged evenly through the gap to reach the distribution element.

In use of a spraying head as defined above, the herbicide or other agent flows through the annular gap to reach the surface of the distribution element or disc as a tubular stream centered on the rotary axis of the disc. Consequently, the agent will be ejected from the periphery of the disc as an even spray of droplets.

Preferably, the projection is hollow and receives a stem of the distribution element, The said one body component may comprise a housing for an electric motor driving the distribution element, in which case the output spindle of the motor may extend into the projection to engage the distribution element.

The said other body component may comprise a cop on the said one body component or housing. In one preferred embodiment, the housing has bores distributed about the rotary axis of the distribution element, each bore being connected to the annular cavity by a respective metering orifice. The orifices have different flow cross-sectional areas from each other. The cap is provided with a single bore and is rotatable relatively to the housing in order to bring the bore in the cap into alignment with a selected one of the bores in the housing, the cap and the housing then being fixed in position relatively to each other by a fitting which can be inserted into the aligned bores. The fitting is provided at the end of a supply tube for the agent to be applied.

In another preferred embodiment, the wall defining the aperture in the cap, and a surface on the projection are inclined relatively to the rotary axis of the distribution element, and the cap is axially displaceable on the housing to vary the flow cross-sectional area of the annular gap, thereby to vary the flow rate of the agent to the rotary distribution element.

Preferably, in both embodiments, the width of the annular cavity, as viewed in axial cross-section, is greater than the width of the annular gap. The result of this relationship is that agent supplied to the annular cavity preferentially fills the cavity before flowing through the annular gap.

For convenience, where the said one body component comprises the housing of an electric motor, the housing has one element of a plug and socket connector, so that the housing may be releasably mounted on the end of a lance or other support member for the spraying head.

For a better understanding of the present invention, and to show how it may be carried into effect, reference will now be made, by way of example, to the accompanying drawings, in which.

Figure 1:
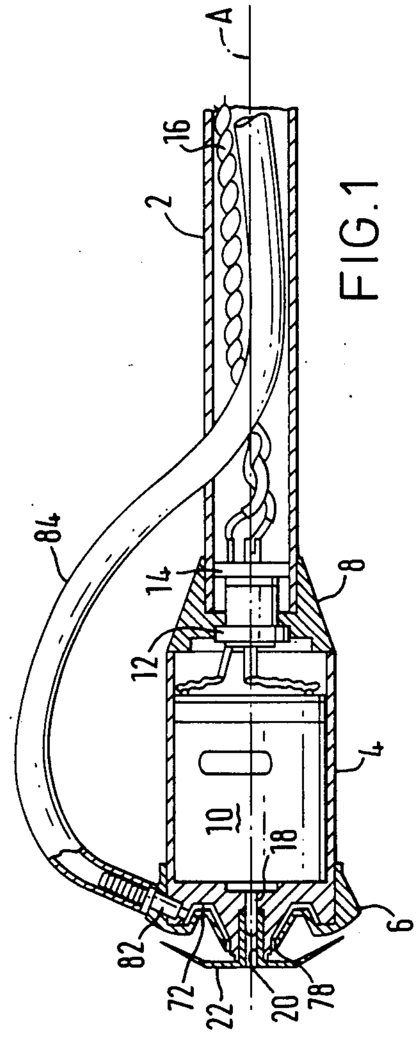
FIG. 1 is a sectional view of a spraying head mounted on a hand lance.

The spraying head shown in FIG. 1 is mounted at one end of a tubular support 2 of a hand lance. The end of the tubular support 2 which is not shown in FIG. 1 is connected to a handle in the manner described, for example, in my British Patent Specification No. 2131327.

The spraying head comprises a housing 4 which is provided at one end with a cap 6 and at the other end with a fitting 8 which receives the tubular support 2. The housing 4 contains an electric motor 10. The terminals of the motor 10 are connected to a socket 12 provided in the fitting 8. The socket 12 receives a plug 14 which is connected by a lead 16 extending in the tubular support 2 to a suitable power source as a battery. The output spindle 18 of the motor 10 engages a stem 20 of a rotary distribution element or disc 22.

Figure 4:
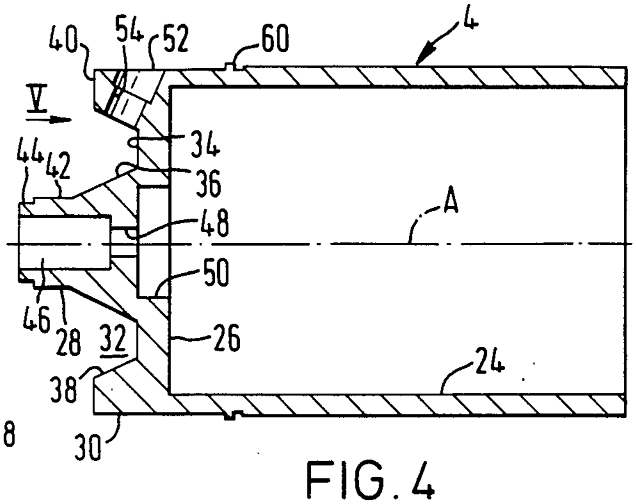
FIG. 4 is a sectional view of another component of the spraying head of FIGS. 1 and 3.

The housing 4 is shown in more detail in Figure 4. It comprises a cylindrical wall portion 24 which terminates at one end at an end wall 26. The end wall 26, on the side away from the motor 10, has a central projection 28 and a peripheral wall 30. Between the projection 28 and the wall 30 there is an annular channel 32 which has a flat base 34 lying in a plane perpendicular to the central axis A of the head, and sloping side walls 36 and 38 respectively provided on the projection 28 and the wall 30. The wall 30 terminates at a surface 40 lying in a plane perpendicular to the axis A. The inclined wall 36 of the projection 28 meets an axially extending wall portion 42 which terminates at a stepped portion 44.

The projection 28 is hollow, having a bore 46 extending inwardly from its outer end and being connected by a narrower bore 48 to a cylindrical recess 50 for receving part of the housing of the motor 10.

Figure 5:
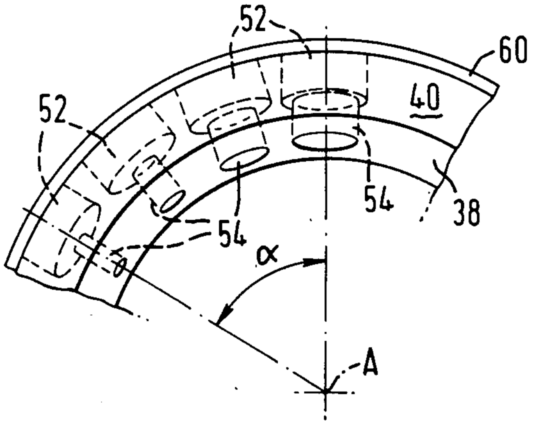
FIG. 5 is an enlarged fragmentary view taken in the direction of the arrow V in FIG. 4.

A series of bores 52 extend obliquely inwards from the outer face of the wall 30 and communicate through metering orifices 54 while the annular channel 32. This arrangement is shown in FIG. 5. The metering orifices 54 have different diameters from each other. The centrelines of the bores 52 and that metering orifices 54 are regularly distributed along an arc subtending an angle $\alpha$ at the axis A. In the illustrated embodiment, the angle $\alpha$ is 60°.

Figure 3:
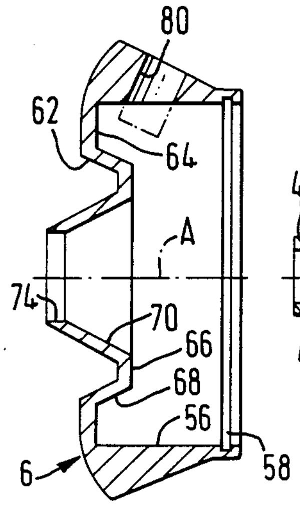
FIG. 3 is a sectional view of one component of the spraying head of FIGS. 1 and 2.

The cap 6 is shown in FIG. 3. The cap 6 has a cylindrical inner surface 56 which fits over the outer surface of the annular wall 30 at one end. The cylindrical surface 56 has an annular groove 58 for engagement with a rib 60 on the outer surface of the cylindrical wall 24 of the body 4 to retain the cap axially on the housing 4, while permitting rotation of the cap relatively to the housing 4 about the axis A.

At the end away from the groove 58, the cap has an end wall 62, the inner surface of which corresponds generally in shape to the outer surface of the end wall 26. Thus, the inner surface of the end wall 62 has portions 64 and 66, which lie in planes perpendicular to the axis A and correspond to the portions 40 and 34 respectively, and oblique portions 68 and 70, which correspond to the portions 36 and 38 respectively. However, the correspondence is not exact, as will be appreciated from FIG. 1, since the configuration of the opposing surfaces is such that, when the portions 40 and 64 abut each other, there is left between the portions 34, 36 and 38 on the one hand and 68, 66 and 70 on the other hand an annular cavity 72.

The end wall 62 of the cap 6 has a central aperture 74 in which the projection 28 is received, the cylindrical wall portion 42 of the projection 28 and the wall of the aperture 74 defining between them an annular gap 78 (FIG. 1). The dimensions are such that the radial width of the gap 78 is less than the width between the respective portions 68, 38; 66, 34 and 70, 36.

The cap 6 has a single bore 80, which has the same diameter as each of the bores 52 in the housing 4. When the cap is fitted on the housing 4, it can be rotated to bring the bore 80 into alignment with any selected one of the bores 52. A fitting 82 (FIGS. 1 and 2) can then be inserted into the aligned bores to fix the cap 6 in position with respect to the housing 4. The fitting 82 is provided at one end of a flexible tube 84 which extends through the tubular support 2 for connection to a source of the agent to be applied.

For operation, the cap 6 is rotated relatively to the housing 4 until the bore 80 is aligned with a selected one of the bores 52 and the corresponding orifice 54. The sizes of the orifices 54 govern the rate of flow of agent into the annular cavity defined between the cap 6 and the body 4. The orifices may, for example, have diameters of 0.75 mm, 1.50 mm, 2.25 mm and 3 mm. Suitable markings may be provided on the cap 6 and the housing 4 to provide an identification of which orifice 54 has been selected. Power is supplied to the motor 10 through the lead 16 to rotate the disc 22. Herbicide or other agent is supplied through the flexible tube 84 to the fitting 82. The agent then flows through the selected orifice 54 into the annular cavity 72 between the cap 6 and the housing 4. Because the width of the cavity is greater than the width of the gap 78, the agent entirely fills the cavity 72 before issuing from the gap 78. The agent thus issues from the gap 78 as a tubular stream and thus reaches the disc 22 evenly about the axis A. The agent progresses under centrifugal force to the periphery of the disc 22, from which is it ejected in a welldefined pattern as a large number of small droplets.

The rate of flow of agent to the disc 22 will depend on the desired width of spray, and can be adjusted by removing the fitting 82 from the aligned bores 80 and 52, rotating the cap 6 to bring the bore 80 into alignment with a different one of the bores 52, and re-inserting the fitting 82 to lock the cap in position with respect to the housing 4. It will be appreciated that those bores 52 which are not aligned with the bore 80 will be closed by the cylindrical surface 56 of the cap 6. This prevents the flow of agent from the annular cavity 72 through those orifices 54 and bores 52 which have not been selected, and also prevents the penetration of dirt into those orifices and bores.

Figure 2:
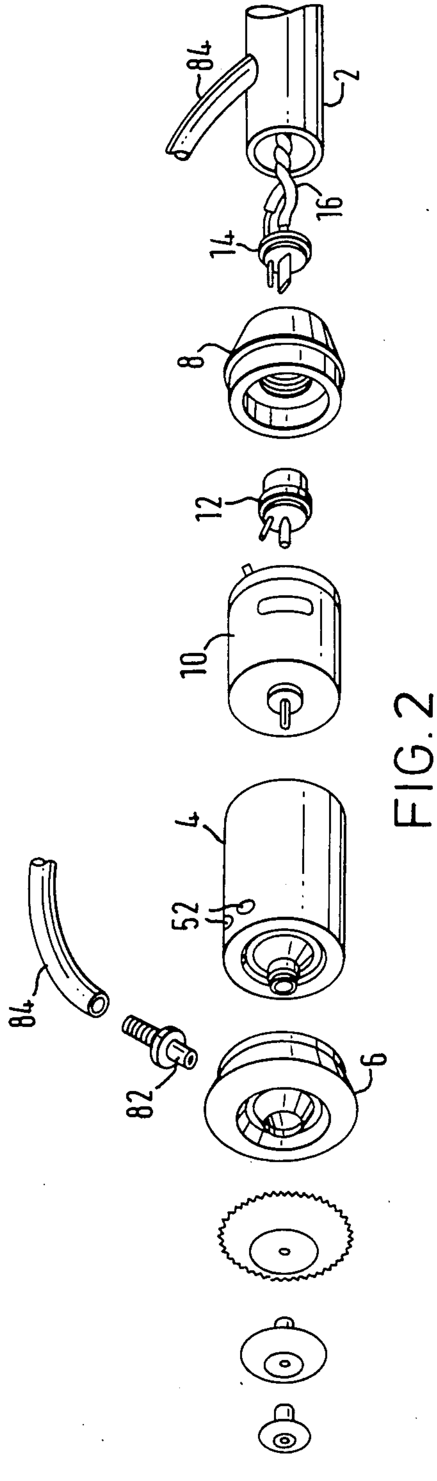
FIG. 2 is an exploded view of the spraying head of FIG. 1.

FIGS. 6 to 9 show a body 104 and a cap 106 which can replace the body 4 and the cap 6 of FIGS. 1 and 2. As with the embodiment of FIGS. 1 to 5, the body 104 has a cylindrical wall 124, which encloses the motor 10, and an end wall 126 which is provided with a projection 128. As with the embodiment shown in FIG. 4, the projection 128 is provided with bores 146 and 148 and with a recess 150, corresponding to the bores 46 and 48 and the recess 50 of FIG. 4. The projection 128 has a cylindrical seating portion 90, from which projects a reduced-diameter portion 92. The portion 92 has an annular groove 94, and terminates at a tapered portion 96.

Figure 8:
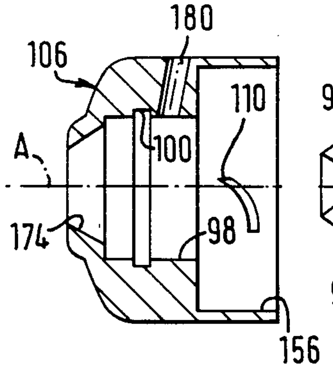
FIG. 8 is a sectional view of one component of the spraying head of FIGS. 6 and 7.
Figure 9:
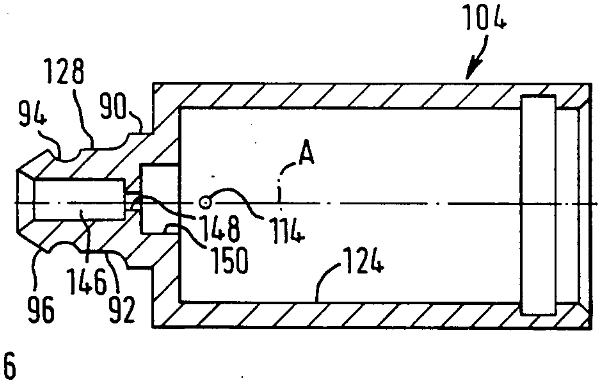
FIG. 9 is a sectional view of another component of the spraying head of FIGS. 6 and 7.

The cap 106 has a cylindrical surface 156 which fits over the outer surface of the wall 124. The cap 106 also has a bore 98, the diameter of which corresponds to the diameter of the seating portion 90. The bore has an annular groove 100 and communicates with an aperture 174 which has tapered walls corresponding to the tapered portion 96 of the housing 104. The cap 106 also has a bore 180 which corresponds to the bore 80 in the cap 6 of FIG. 3. An opening 110 extends through the cap 106 to the surface 156. In the assembled head, a knurled screw 112 extends through the opening 110 and engages a tapped hole 114 in the wall 124 of the housing 104. In FIG. 8, the opening 110 is shown as a short, axially-extending slot, which enables the cap 106 to be axially displaced relatively to the housing 104 by unscrewing the screw 112. When the cap 106 is in the desired position relatively to the housing 104, the screw 112 can be tightened to lock the two components in position.

Figure 7:
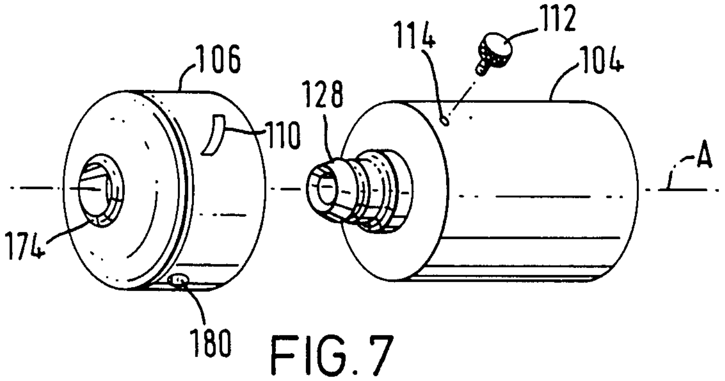
FIG. 7 is an exploded view of the spraying head of FIG. 6.
Figure 6:
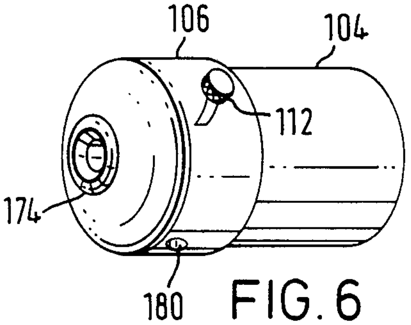
FIG. 6 is a perspective view of another embodiment of spraying head.

FIG. 7 shows an alternative embodiment in which the opening 110 is in the form of a slot which extends obliquely with respect to a plane perpendicular to the axis A. With this form of opening 110, axial displacement of the cap 106 with respect to the housing 104 is achieved by releasing the screw 112 and rotating the cap 106 relatively to the housing 104. Again, the cap and the housing 104 are fixed in position by tightening the screw 112.

When the cap 106 and the housing 104 are fitted together, an annular cavity corresponding to the cavity 72 of FIG. 1 is formed between the cylindrical portion 92 of the projection 128 and the wall of the bore 98. The tapered portion 96 of the projection is situated within the aperture 174 to define an annular gap corresponding to the gap 78 of FIG. 1. By axially displacing the cap 10 relatively to the housing 104 in the manner mentioned above, the width of the gap can be varied to adjust the rate of flow of agent to the disc. The grooves 94 and 100 cooperate to provide an annular reservoir between the bore 180 and the gap between the tapered portion 96 and the aperture 174 to ensure that the agent is evenly distributed around the axis A before it reaches the gap.

Figure 10:
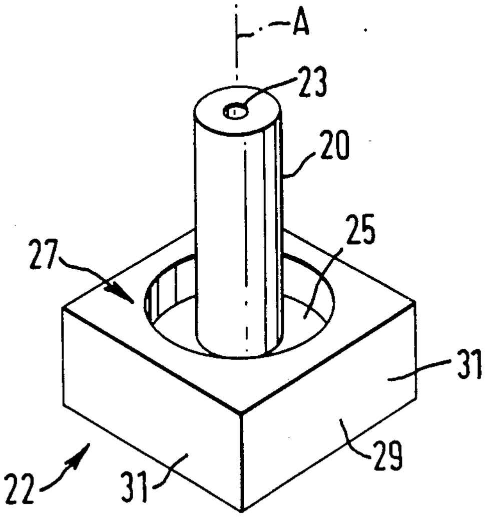
FIG. 10 is a perspective view of one form of rotary distribution element for use with the spraying heads of FIGS. 1 to 9.
Figure 11:
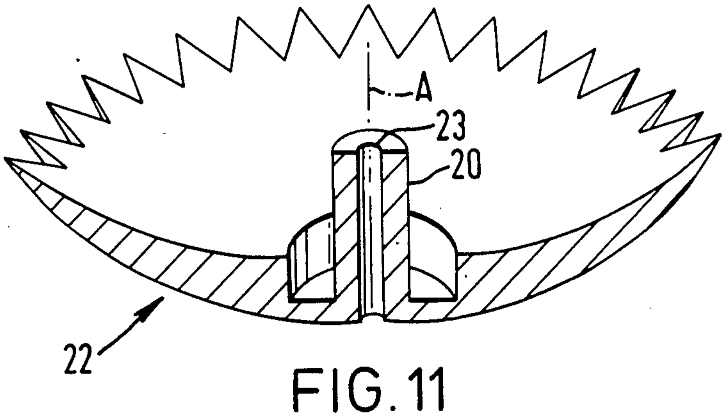
FIG. 11 is a partly sectioned perspective view of another form of rotary distribution element for use with the spraying heads of FIGS. 1 to 9.

FIGS. 10 and 11 show two forms of disc which are suitable for use with the spraying head of FIGS. 1 to 5. The disc of FIG. 10 is square, as viewed along the axis A, the side of the square being 8.5 mm. The disc is provided with a stem 22 having a bore 23 within which, in use, the spindle 18 of the motor 10 is a friction fit. The disc 22 has a distribution surface 27 which includes a recess 25 provided at the base of the stem 20 for receiving the stepped portion 44 of the projection 28. The depth of the recess 25 thus corresponds to the length of the stepped portion 44, and may be, for example, 1.5 mm. The outer wall of the recess has, at its upper end, a diameter which is slightly greater than the diameter of the cylindrical portion 42 of the projection 28. For example, this cylindrical portion may have a diameter of 6.58 mm, while the outer diameter of the recess 25 may be 6.70 mm.

The distribution surface 27 has a square periphery 29 at which it meets four rectangular side surfaces 31 which are parallel to the axis A of the disc. The axial length of each surface 31 is at least one tenth of the length of each side of the square distribution surface 27, and is preferably between 0.25 and 0.75 of this length.

The disc shown in FIG. 11 is a circular, concave disc having a serrated periphery, but is also provided with the recess 25 for cooperation with the stepped portion 44 of the projection 28. The dimensions of the recess are substantially the same as those of the recess 25 of the disc shown in FIG. 10.

Figure 12:
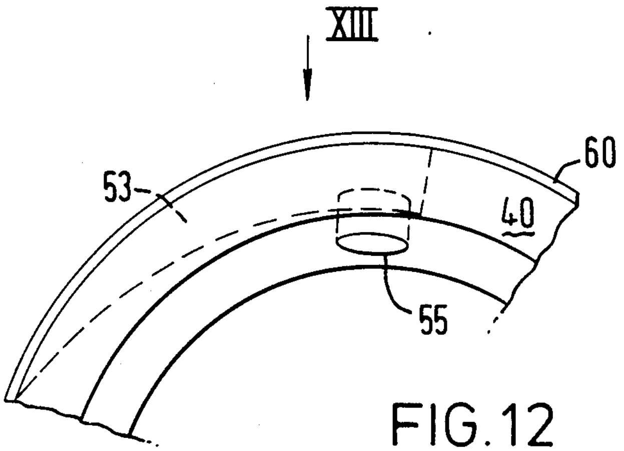
FIG. 12 is a view similar to FIG. 5 but showing an alternative embodiment.
Figure 13:
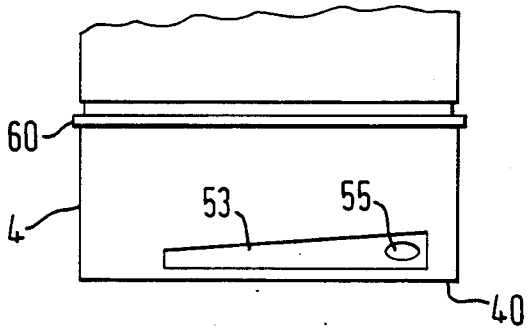
FIG. 13 is a view in the direction of the arrow XIII in FIG. 12.

FIGS. 12 and 13 show an alternative embodiment which is similar to that described with reference to FIGS. 3 to 5. In the housing of FIGS. 12 and 13, the bores 52 and metering orifices 54 are replaced by a groove 53 and a passage 55. The passage 55 is situated near one end of the groove 53 and provides communication between the groove and the annular cavity 72 (see FIG. 1). The groove tapers both axially and radially in the direction away from the passage 55, so that the flow cross-section of the groove 53 varies throughout its length.

The opening 80 in the cap 6 (FIG. 3) is situated over the groove 53 and, by rotating the cap 6 on the housing 4, can be moved from a position overlying one end of the groove 53 to a position overlying the other end of the groove 53. The cap 6 and the housing 4 may cooperate in a ratchet-like manner so that the cap 6 can be "clicked" into a desired position.

The fitting 82 may be permanently fixed in the opening 80, but it will not project beyond the inner face of the cap 6. It will be appreciated that rotation of the cap 6 on the housing 4 will alter the flow cross-section of the flow path between the fitting 82 and the passage 55, so altering the rate of flow of material to the disc 22.

I claim:

1. A spraying head comprising a body and a rotary distribution element supported by the body, the body comprising:

a first body component having a projection which extends coaxially with the distribution element;

a second body component having an aperture in which the projection is situated, the second body component being connected rotatably to the first body component;

an annular gap defined between the projection and the periphery of the aperture;

an annular cavity defined between the first and second body components, the cavity communicating with the gap;

inlet means, opening into the cavity, for material to be sprayed;

a first opening provided in the second body component;

a plurality of second openings provided in the first body component, the first opening being movable selectively into alignment with the second openings by rotation of the second body component relatively to the first body component;

a plurality of metering orifices of different crosssectional area from each other, each metering orifice providing communication between a respective one of the second openings and the cavity; and an inlet fitting which is removably insertable into the first opening and an aligned one of the second openings, thereby to retain the body components against rotation relative to each other.

2. A spraying head as claimed in claim 1, wherein the inlet fitting is a push fit in the first and second openings.

3. A spraying head as claimed in claim 1, wherein the inlet fitting is adapted to be connected to an end of a flexible tube.

4. A spraying head as claimed in claim 1, wherein the cavity is channel-shaped as viewed in radial cross-section.

5. A spraying head as claimed in claim 1, wherein the inlet means comprises an opening in the second body component.

* * * * *